United States Patent
Wegmann et al.

(10) Patent No.: US 10,683,409 B2
(45) Date of Patent: Jun. 16, 2020

(54) ADDITIVE MIXTURE FOR STABILIZATION OF POLYOL AND POLYURETHANE

(71) Applicant: BASF SE, Ludwigshafen (DE)

(72) Inventors: Alex Wegmann, Ettingen (CH); Cinzia Tartarini, Pontecchio Marconi BO (IT)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/070,596

(22) PCT Filed: Jan. 11, 2017

(86) PCT No.: PCT/EP2017/050472
§ 371 (c)(1),
(2) Date: Jul. 17, 2018

(87) PCT Pub. No.: WO2017/125291
PCT Pub. Date: Jul. 27, 2017

(65) Prior Publication Data
US 2019/0023869 A1    Jan. 24, 2019

(30) Foreign Application Priority Data

Jan. 21, 2016 (EP) .................................... 16152274
Oct. 17, 2016 (EP) .................................... 16194214

(51) Int. Cl.
*C08K 5/134* (2006.01)
*C08K 5/1545* (2006.01)
*C08K 5/1535* (2006.01)
*C08K 5/526* (2006.01)

(52) U.S. Cl.
CPC .......... *C08K 5/1345* (2013.01); *C08K 5/1535* (2013.01); *C08K 5/1545* (2013.01); *C08K 5/526* (2013.01)

(58) Field of Classification Search
CPC ....... C08L 75/00; C08K 5/1545; C08K 5/134; C08K 5/1345
See application file for complete search history.

(56) References Cited

U.S. PATENT DOCUMENTS

| | | |
|---|---|---|
| 4,325,863 A | 4/1982 | Hinsken et al. |
| 4,338,244 A | 7/1982 | Hinsken et al. |
| 5,175,312 A | 12/1992 | Dubs et al. |
| 5,216,052 A | 6/1993 | Nesvadba et al. |
| 5,218,008 A | 6/1993 | Parrish |
| 5,252,643 A | 10/1993 | Nesvadba |
| 5,270,430 A * | 12/1993 | Parrish .................. C08K 5/1545 252/182.27 |
| 5,516,920 A | 5/1996 | Nesvadba et al. |
| 5,695,689 A | 12/1997 | Gupta et al. |
| 7,468,410 B2 | 12/2008 | Chafin et al. |
| 8,008,383 B2 | 8/2011 | Gelbin et al. |
| 8,304,477 B2 | 11/2012 | King et al. |
| 8,563,637 B2 | 10/2013 | Jakupca et al. |
| 10,421,851 B2 * | 9/2019 | Demassa ............ C08G 18/4829 |
| 2006/0142441 A1 * | 6/2006 | Chan ...................... C08G 18/10 524/100 |

(Continued)

FOREIGN PATENT DOCUMENTS

| | | |
|---|---|---|
| DE | 4316611 A1 | 11/1993 |
| DE | 4316622 A1 | 11/1993 |
| DE | 4316876 A1 | 11/1993 |

(Continued)

OTHER PUBLICATIONS

Anonymous (Additive mixture for stabilization of polyol and polyurethane. IP.com, Nov. 9, 2016, 35 pages).*
Carbowax (Carbowax Polyethylene Glycol (PEG) 400. DOW, 2011, 2 pages).*
International Search Report dated Apr. 3, 2017, in PCT/EP2017/050472, filed Jan 11, 2017.

(Continued)

*Primary Examiner* — Brieann R Johnston
(74) *Attorney, Agent, or Firm* — Oblon, McClelland, Maier & Neustadt, L.L.P.

(57) ABSTRACT

The invention relates to a composition, which comprises the components (a) an organic material susceptible to oxidative, thermal or light-induced degradation, which is a polyether polyol, a polyester polyol or a polyurethane; (b) a bisphenolic stabilizer of formula (I) wherein n is 1, 2, 3, 4, 5, 6, 7, 8, 9, 10 or 11; and (c) a chromanol stabilizer of formula (II) wherein $R^1$ and $R^2$ are independently of each other H or $C_1$-alkyl. A process for manufacturing the aforementioned composition, the use of an additive mixture comprising component (b) and (c) for stabilizing the component (a) and the additive mixture itself are described.

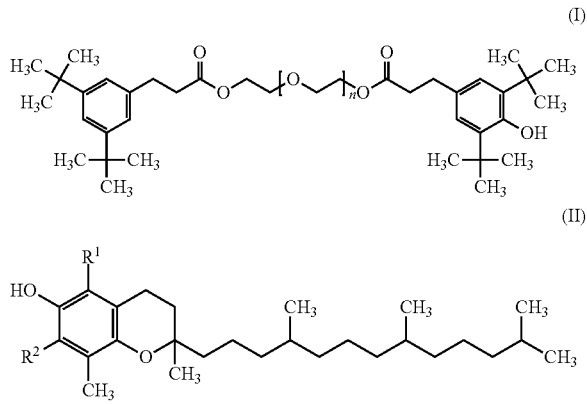

17 Claims, No Drawings

(56) References Cited

U.S. PATENT DOCUMENTS

2011/0196082 A1    8/2011   Hornbach et al.
2014/0163145 A1    6/2014   Anker et al.

FOREIGN PATENT DOCUMENTS

| EP | 0406169 A1 | 1/1991 |
| EP | 0589839 A1 | 3/1994 |
| EP | 0591102 A1 | 4/1994 |
| EP | 0871066 A1 | 10/1998 |
| GB | 2281910 A | 3/1995 |
| WO | WO 93/10178 A1 | 5/1993 |
| WO | WO 2010/003813 A1 | 1/2010 |

OTHER PUBLICATIONS

Extended European Search Report dated Jul. 26, 2016 in Patent Application No. 16152274.3.

\* cited by examiner

ADDITIVE MIXTURE FOR STABILIZATION OF POLYOL AND POLYURETHANE

This application is a National Phase of PCT/EP2017/050472, which was filed on Jan. 11, 2017. This application is based on and claims the benefit of priority to European Application No. 16194214.9, which was filed on Oct. 17, 2016, and to European Application No. 16152274.3, which was filed on Jan. 21, 2016.

The current invention relates to a composition comprising a polyether polyol, a polyester polyol or a polyurethane as component (a) and an additive mixture for stabilizing component (a). The additive mixture comprises a specific bisphenolic stabilizer as component (b) and a specific chromanol stabilizer as component (c). A process for manufacturing the aforementioned composition, the use of the additive mixture for stabilizing the component (a) and the additive mixture itself are addressed.

Polyurethane is widespreadly used as an engineering material in many technical applications. Like many organic materials, polyurethane is susceptible to degradation caused by exposure to energy or chemically reactive species. There is on one side already the initial exothermic reaction of the starting materials polyol and di- or polyisocyanates forming the polyurethane itself and on the other side the long-term exposure during its operating time. The formed polyurethane might further be initially exposed to an industrial processing, for example in case of a thermoplastic polyurethane an extrusion under elevated temperature and high shear forces. In case of a polyurethane foam, the initial exothermic reaction of the starting materials is conducted under conditions, where a foaming agent like water is bubbling up. A polyether polyol or a polyester polyol is often used as a polyol starting material of a polyurethane, if a polyurethane with a soft foam consistency is desired. A polyether polyol or a polyester polyol are themselves already organic materials susceptible to degradation caused by exposure to energy or chemically reactive species. If they are employed already in a marred state as a starting material for a polyurethane, this is not beneficial for resistance of the formed polyurethane.

U.S. Pat. No. 5,695,689 discloses polyether polyols, which are stabilized by tocopherols. In some of its examples, α-tocopherol is or α-tocopherol and octylated diphenylamine are added to a polyether polyol as stabilizer during production of polyurethane foams.

WO 93/10178 discloses polyethers containing an antioxidant as well as polyurethanes made from such polyethers. In some of its examples, polyurethane foams are prepared based on the reaction of polyols and toluene diisocyanate in the presence of inter alia an α-tocopherol mixture and Irganox L 135 (RTM, BASF) as antioxidants. Irganox L 135 is stated as a commercial grade of 3,5-di-t-butyl-4-hydroxy-hydrocinnamic acid ester of a mixture of $C_7$-$C_9$ alcohols.

Despite of a series of already available stabilizer concepts, there is still a need for further technical concepts towards an improved stabilization of a polyether polyol, a polyester polyol or a polyurethane against the detrimental impact of heat, light and/or oxidation. In addition to the desired stabilization effect, the technical concept preferably allows a simplified handling during its application.

It is an object of the present invention to provide an improved stabilization against the detrimental impact of heat, light and/or oxidation. In particular, a good resistance against oxidation by oxygen is desired. In particular, a good resistance against scorching, which is a degradation observed at a material in the form of a foam, is desired.

The object is achieved, according to the invention, by a composition, which comprises the components
- (a) an organic material susceptible to oxidative, thermal or light-induced degradation, which is a polyether polyol, a polyester polyol or a polyurethane;
- (b) a bisphenolic stabilizer of formula I

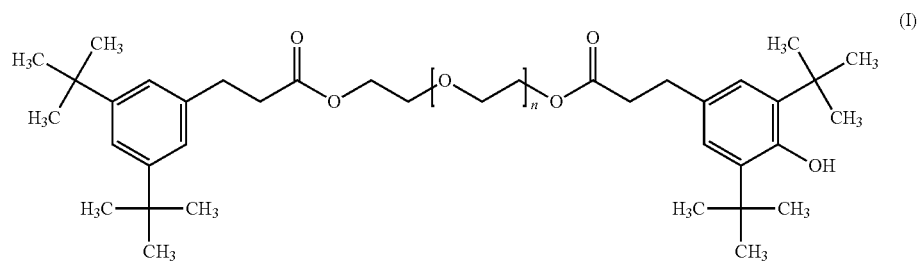

(I)

wherein
n is 1, 2, 3, 4, 5, 6, 7, 8, 9, 10 or 11; and
(c) a chromanol stabilizer of formula II

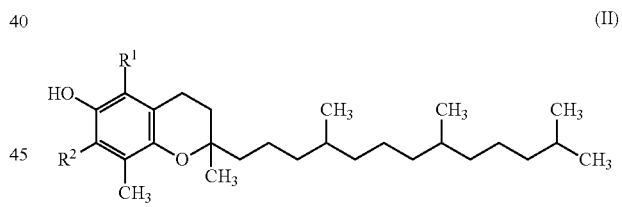

(II)

wherein
$R^1$ and $R^2$ are independently of each other H or $C_1$-alkyl.

A polyether polyol is for example a hydroxyl-terminated polyether. A hydroxyl-terminated polyether is prepared for example by polymerizing epoxides such as ethylene oxide, propylene oxide, butylene oxide, tetrahydrofuran, styrene oxide or epichlorohydrin with themselves, for example in the presence of $BF_3$, or by addition reaction of these epoxides, alone or as a mixture or in succession, with starting components containing reactive hydrogen atoms, such as water, alcohols, ammonia or amines, for example ethylene glycol, propylene 1,3- and 1,2-glycol, trimethylolpropane, 4,4'-dihydroxydiphenylpropane, aniline, ethanolamine or ethylenediamine. Sucrose polyethers are also suitable. Particular preference is given to a polyether polyol, which predominantly (up to 90% by weight, based on all the OH groups present in the polyether) contain primary OH groups. Furthermore, a polyether polyol modified by vinyl polymers, as is formed, for example, by polymerizing styrene and acrylonitrile in the presence of a polyether polyol, is suitable.

In particular, a polyether polyol compound has a molecular weight of 400-10000, especially 800 to 10000, and is a polyhydroxy compound, especially containing from 2 to 8 hydroxyl groups, especially from 2 to 4.

A polyester polyol is produced for example by polycondensation of a diacid and a diol, wherein the diol is applied in excess. Partial replacement of the diol by a polyol with more than two hydroxyl groups leads to a ramified polyester polyol. A diacid is for example adipic acid, glutaric acid, succinic acid, maleic acid or phthalic acid. A diol is for example ethylene glycol, diethylene glycol, 1,4-butane diol, 1,5-pentane diol, neopentyl glycol or 1,6-hexane diol. A polyol with more than two hydroxyl groups is for example glycerin, trimethylol propane or pentaerythritol.

A polyurethane is for example a polyurethane synthesized from a polyol and an aliphatic or aromatic polyisocyanate such as polyurethanes derived from hydroxyl-terminated polyethers, polyesters or polybutadienes on the one hand and aliphatic or aromatic polyisocyanates on the other, as well as precursors thereof.

A suitable polyisocyanate is aliphatic or aromatic, for example ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3- and -1,4-diisocyanate and also any desired mixtures of these isomers, 1-isocyanato-3,3,5-trimethyl-5-isocyanatomethylcyclohexane, 2,4- and 2,6-hexahydrotolylene diisocyanate and also any desired mixtures of these isomers, hexahydro-1,3- and/or -1,4-phenylene diisocyanate, perhydro-2,4'- and/or -4,4'-diphenylmethanediisocyanate, 1,3- and 1,4-phenylene diisocyanate, 2,4- and 2,6-tolylene diisocyanate, and also any desired mixtures of these isomers, diphenylmethane 2,4'- and/or -4,4'-diisocyanate, naphthylene 1,5-diisocyanate, triphenylmethane 4,4',4"-triisocyanate, polyphenyl-polymethylene polyisocyanates as are obtained by aniline-formaldehyde condensation followed by phosgenization, m- and p-isocyanatophenylsulfonyl isocyanates, perchlorinated aryl polyisocyanates, polyisocyanates containing carbodiimide groups, polyisocyanates containing allophanate groups, polyisocyanates containing isocyanurate groups, polyisocyanates containing urethane groups, polyisocyanates containing acylated urea groups, polyisocyanates containing biuret groups, polyisocyanates containing ester groups, reaction products of the abovementioned isocyanates with acetals, and polyisocyanates containing polymeric fatty acid radicals.

It is also possible to employ the isocyanate group-containing distillation residue, as it is or dissolved in one or more of the abovementioned polyisocyanates, which are obtained in the course of the industrial preparation of isocyanates. It is additionally possible to use any desired mixtures of the abovementioned polyisocyanates.

Preferred is 2,4- or 2,6-tolylene diisocyanate or any desired mixtures of these isomers ("TDI"), polyphenyl-polymethylene-polyisocyanates as prepared by aniline-formaldehyde condensation followed by phosgenization ("crude MDI") or polyisocyanates containing carbodiimide, urethane, allophanate, isocyanurate, urea or biuret groups ("modified polyisocyanates").

The polyurethane can be a homogeneous polyurethane or a cellular one.

Preferred is a composition, wherein the organic material of component (a) is a polyether polyol or a polyurethane, which is polymerized by reaction of starting materials comprising a polyether polyol as one starting material. In particular, the organic material of component (a) is a polyether polyol or a polyurethane, which is polymerized by reaction of a polyisocyanate and a polyether polyol. Very particular, the organic material of component (a) is a polyurethane, which is polymerized by reaction of a polyisocyanate and a polyether polyol.

Preferred is a composition, wherein at formula I of the bisphenolic stabilizer n is 1, 2, 3, 4, 5 or 6. Especially preferred is a bisphenolic stabilizer of formula I with n=1, 2, 3 or 4, in particular with n=2, 3 or 4 and very particular with n=2 or 3.

It is possible to employ as component (b) a mixture of at least two bisphenolic stabilizers of formula I, especially a mixture wherein the first bisphenolic stabilizer is of formula I with n and the second bisphenolic stabilizer is of formula I with n+1. Accordingly, the second bisphenolic stabilizer differs from the first bisphenolic stabilizer by one further ethoxy group. At such a mixture, n is an integer between 1 and 10. Preferably, n is an integer between 1 and 5.

Preferred is a composition, wherein the component (b) is a mixture of at least two bisphenolic stabilizers of formula I, wherein the first bisphenolic stabilizer is of formula I with n, the second bisphenolic stabilizer is of formula I with n+1 and n is 1, 2, 3, 4 or 5.

The bisphenolic stabilizer of formula I is for example obtainable by condensation of 3-(3,5-ditert-butyl-4-hydroxy-phenyl)propanoic acid as depicted

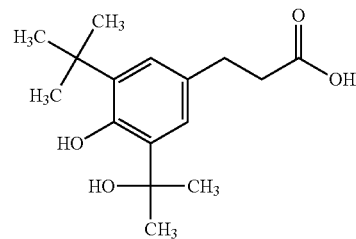 [SMILES: CC(C)(C)c1cc(CCC(=O)O)cc(C(C)(C)O)c1O]

and a respective glycol derivative of formula IV

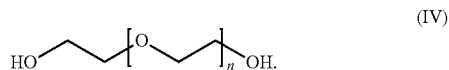

(IV)

It is synthetically advantageous to conduct the condensation via a transesterification of an ester, e.g. methyl-(3,5-ditert-butyl-4-hydroxy-phenyl)propanoate. A glycol derivative of formula IV is for example so-called diethylene glycol with n=1, i.e. 2-(2-hydroxyethoxy)ethanol, so-called triethylene glycol with n=2, i.e. 2-[2-(2-hydroxyethoxy)ethoxy]ethanol, so-called tetraethylene glycol with n=3, i.e. 2-[2-[2-(2-hydroxyethoxy)ethoxy]ethoxy]ethanol, so-called pentaethylene glycol with n=4, i.e. 2-[2-[2-[2-(2-hydroxyethoxy)ethoxy]ethoxy]ethoxy]ethanol or a further homologue glycol until n=11. Also suitable is a mixture of at least two glycol derivatives of formula IV, especially a mixture wherein the at least two glycol derivatives of formula IV differ from each other by one ethoxy group. This results in a mixture with at least two bisphenolic stabilizers of formula I, wherein the first bisphenolic stabilizer is of formula I with n and the second bisphenolic stabilizer is of formula I with n+1. At such a mixture, n is an integer between 1 and 10. Technical available are mixtures of glycol derivatives of formula IV, for example polyethylene glycol 200 or polyethylene 300. Preferably, glycol derivatives are of formula IV with n=1, 2, 3, 4, 5 or 6, in particular 1, 2, 3 or 4 and very particular 2 or 3. Furthermore, a bisphenolic stabilizer of formula I, which is obtainable by the condensation of 3-(3,5-ditert-butyl-4-hydroxy-phenyl)propanoic acid with polyethylene glycol 200 or by transesterification of methyl-(3,5-ditert-butyl-4-hydroxy-phenyl)propanoate with polyethylene 200 is preferred.

A chromanol stabilizer of formula II possesses three asymmetric carbon atoms at positions 2, 4' and 8' in its chemical structure. All combinations of R and S configurations at the single asymmetric carbon atoms are covered including also mixtures of enantiomers and diastereomers, for example racemic mixtures. A chromanol stabilizer of formula II is for example α-tocopherol, i.e. $R^1$ is $C_1$-alkyl, $R^2$ is $C_1$-alkyl and the configuration 2R, 4'R and 8'R, β-tocopherol, i.e. $R^1$ is $C_1$-alkyl, $R^2$ is hydrogen and the configuration 2R, 4'R and 8'R, γ-tocopherol, i.e. $R^1$ is hydrogen, $R^2$ is $C_1$-alkyl and the configuration 2R, 4'R and 8'R, or δ-tocopherol, i.e. $R^1$ is hydrogen, $R^2$ is hydrogen and the configuration 2R, 4'R and 8'R. Mixtures of chromanol stabilizers of formula II are also suitable. For example, natural vitamin E or industrially synthesized vitamin E contains chromanol stabilizers of formula II. Preferably, at least one of $R^1$ and $R^2$ is $C_1$-alkyl. In particular, $R^1$ and $R^2$ are $C_1$-alkyl.

Preferred is a composition, wherein at formula II of component (c), at least one of $R^1$ and $R^2$ is $C_1$-alkyl.

Preferred is a composition, wherein at formula II of component (c), $R^1$ and $R^2$ are $C_1$-alkyl.

Preferably, the combined amount of the bisphenolic stabilizer of formula I as component (b) and of the chromanol stabilizer of formula II as component (c) is in the range from 0.1% to 10% by weight based on the weight of the organic material as component (a). In particular, the combined amount is in the range from 0.2% to 5% by weight, very particular in the range from 0.3% to 1.5% by weight and especially in the range from 0.35% to 0.7% by weight.

Preferred is a composition according to any preceding claim, wherein the combined amount of the bisphenolic stabilizer of formula I as component (b) and the chromanol stabilizer of formula II as component (c) is in the range from 0.1% to 10% by weight based on the weight of the organic material as component (a).

Preferably, the weight ratio of the bisphenolic stabilizer of formula I as component (b) to the chromanol stabilizer of formula II as component (c) is between 0.5 and 20. As an example, a weight ratio of 0.5 represents 1 part by weight of the bisphenolic stabilizer of formula I as component (b) and 2 parts by weight of the chromanol stabilizer of formula II as component (c). As a further example, a weight ratio of 20 represents 1 part by weight of the bisphenolic stabilizer of formula I as component (b) and 0.05 parts by weight of the chromanol stabilizer of formula II as component (c). In particular, the weight ratio is between 0.9 and 11, very particular between 0.95 and 8, especially between 1 and 5 and very especially between 2 and 4.

Preferred is a composition, wherein the weight ratio of the bisphenolic stabilizer of formula I as component (b) to the chromanol stabilizer of formula II as component (c) is between 0.5 and 20, in particular between 0.9 and 11.

Preferred is a composition, which comprises the components
(a) an organic material susceptible to oxidative, thermal or light-induced degradation, which is a polyether polyol, a polyester polyol or a polyurethane;
(b) a bisphenolic stabilizer of formula I, which is obtainable by the transesterification of methyl-(3,5-ditert-butyl-4-hydroxy-phenyl)propanoate with polyethylene 200,
(c) a chromanol stabilizer of formula II, and
the weight ratio of the bisphenolic stabilizer of formula I as component (b) to the chromanol stabilizer of formula II as component (c) is between 2 and 5.

Preferred is a composition, wherein the combined amount of the bisphenolic stabilizer of formula I as component (b) and the chromanol stabilizer of formula II as component (c) is in the range from 0.2% to 5% by weight based on the weight of the organic material as component (a), in particular from 0.3% to 1.5% by weight, and wherein the weight ratio of the bisphenolic stabilizer of formula I as component (b) to the chromanol stabilizer of formula II as component (c) is between 0.9 and 11, in particular between 0.95 and 8.

Optionally, the composition comprising component (a), component (b) and component (c) contains as component (d) a further additive.

A further additive is for example selected from the following list:
1. Antioxidants
1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methyl phenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1-methylundec-1-yl)phenol, 2,4-dimethyl-6-(1'-methylheptadec-1-yl)phenol, 2,4-dimethyl-6-(1'-methyltridec-1'-yl)phenol, 2,4-dimethyl-6-(1'-methyl-1'-tetradecyl-methyl)-phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.5. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4- hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.6. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.7. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.8. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.9. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.10. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-ditert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid, (3,5-ditert-butyl-4-hydroxy-phenyl)methylphosphonic acid.

1.11. Acylaminophenols, for example 4-hydroxylauranilide, 4-hydroxystearanilide, octyl N-(3,5-d i-tert-butyl-4-hydroxyphenyl)carbamate.

1.12. Esters of β-(3,5-di-tert-butyl-4-hydroxyphenyl)propionic acid with mono- or polyhydric alcohols different to a glycol derivative of formula IV, for example with methanol, ethanol, n-octanol, i-octanol, a mixture of linear and branched $C_7$-$C_9$-alkanol, octadecanol, a mixture of linear and branched $C_{13}$-$C_{15}$-alkanol, 1,6-hexanediol, 1,9-nonanediol, ethylene glycol, 1,2-propanediol, neopentyl glycol, thiodiethylene glycol, pentaerythritol, tris(hydroxylethyl)isocyanurate, N,N'-bis-(hydroxyl-ethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.13. Esters of β-(5-tert-butyl-4-hydroxy-3-methylphenyl)propionic acid with mono- or polyhydric alcohols, for example with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.14. Esters of β-(3,5-dicyclohexyl-4-hydroxyphenyl) propionic acid with mono- or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]-octane.

1.15. Esters of 3,5-di-tert-butyl-4-hydroxyphenyl acetic acid with mono- or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert-butyl-4-hydroxyphenyl) propionic acid, for example N,N'-bis(3,5-di-tert-butyl-4-hydroxyphenylpropionyl)hexamethylenediamide, N,N'-bis(3,5-ditert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]-propionyloxy)ethyl]oxamide (Naugard XL-1®, supplied by Uniroyal).

1.17. Ascorbic acid (vitamin C)

1.18. Aromatic amines (aminic antioxidants), for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-secbutyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1,3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

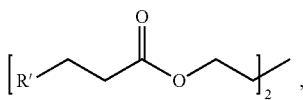

where R'=3'-tert-butyl-4'-hydroxy-5'-2H-benzotriazol-2-yl-phenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-ditert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-6-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline and neopentyl tetra(α-cyano-β,β-diphenylacrylate).

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethyl-piperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-ditert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperid-4-yl)sebacate, bis(1-octyloxy-2,2,6,6-tetramethylpiperid-4-yl)succinate, bis-[2,2,6,6-tetramethyl-1-(undecyloxy)piperidin-4-yl] carbonate, linear or cyclic condensates of N,N'-bis(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268 64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, a mixture of oligomeric compounds which are the formal condensation products of N,N'-bis-(2,2,6,6-tetramethyl-1-propoxy-piperidin-4-yl)-hexane-1,6-diamine and 2,4-dichloro-6-{n-butyl (2,2,6,6-tetramethyl-1-propoxy-piperidin-4-yl)-amino}4-[1,3,5]triazine end-capped with 2-chloro-4,6-bis-(di-n-butylamino)-[1,3,5]triazine, a mixture of oligomeric compounds which are the formal condensation products of N,N'-bis-(2,2,6,6-tetramethyl-piperidin-4-yl)-hexane-1,6-diamine and 2,4-dichloro-6-{n-butyl-(2,2,6,6-tetramethyl-piperidin-4-yl)amino}-[1,3,5]triazine end-capped with 2-chloro-4,6-bis-(di-n-butylamino)-[1,3,5]triazine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)-oxymethyl-3,3,5-trimethyl-2-morpholinone, the reaction product of 2,4-bis-[(1-cyclo-hexyloxy-2,2,6,6-piperidine-4-yl)butylamino]-6-chloro-s-triazine with N,N'-bis-(3-amino-propyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)-amino)-s-triazine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyhoxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]-phenyl}-4,6-bis¬(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis (benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyldihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, $C_{12}$-$C_{18}$ alkyl bis[4-(1-methyl-1-phenyl-ethyl)phenyl] phosphite, $C_{12}$-$C_{18}$ alkenyl bis[4-(1-methyl-1-phenylethyl)phenyl] phosphite, bis[4-(1-methyl-1-phenyl-ethyl)phenyl] [(E)-octadec-9-enyl] phosphite, decyl bis[4-(1-methyl-1-phenyl-ethyl)phenyl] phosphite, didecyl [4-(1-methyl-1-phenyl-ethyl)phenyl] phosphite, [4-(1-methyl-1-phenyl-ethyl)phenyl] bis[(E)-octadec-9-enyl] phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)pentaerythritol diphosphite, bis(2,4,6-tris(tert-butylphenyl)pentaerythritol diphosphite, [2-tert-butyl-4-[1-[5-tert-butyl-4-di(tridecoxy) phosphanyloxy-2-methyl-phenyl]butyl]-5-methyl-phenyl] ditridecyl phosphite, tristearyl sorbitol triphosphite, a mixture of at least two different tris(mono-$C_1$-$C_8$-alkyl)phenyl phosphites such as for example mentioned in U.S. Pat. No. 7,468,410 B2 as products of examples 1 and 2, a mixture of phosphites comprising at least two different tris(amylphenyl) phosphites such as for example mentioned in U.S. Pat. No. 8,008,383 B2 as mixtures 14, 15, 16, 17, 18, 19, 20, 21, 22, 23, 24, 25 and 26, a mixture of a least four different phosphites comprising tris[4-(1,1-dimethylpropyl)phenyl] phosphite, [2,4-bis(1,1-dimethylpropyl)phenyl] bis[4-(1,1-dimethylpropyl)phenyl] phosphite, bis[2,4-bis(1,1-dimethylpropyl)phenyl] [4-(1,1-dimethylpropyl)phenyl] phosphite and tris[2,4-bis(1,1-dimethylpropyl)phenyl] phosphite, a mixture of phosphites comprising at least two different tris(butylphenyl) phosphites such as for example mentioned in U.S. Pat. No. 8,008,383 B2 as mixtures 34, 35, 36, 37, 38, 39 and 40, an oxyalkylene-bridged bis(di-$C_6$-aryl) diphosphite or an oligomeric phosphite obtainable by condensation under removal of hydrogen chloride of (i) a trichlorophosphane, with (ii) a dihydroxyalkane interrupted by one or more oxygen atoms and with (iii) a mono-hydroxy-$C_6$-arene such as for example mentioned in U.S. Pat. No. 8,304,477 B2 as products of examples 1, 2, 3, 4, 5, 6, 7, 8, 9, 10, 11, 12, 13, 14, 15, 16 and 17, a polymeric phosphite obtainable by transesterification under removal of phenol of (i) triphenyl phosphite with (ii) a dihydroxyalkane optionally interrupted by one or more oxygen atoms and/or a bis(hydroxyalkyl)(alkyl)amine and with (iii) a mono-hydroxyalkane optionally interrupted by one or more oxygen atoms such as for example mentioned in U.S. Pat. No. 8,563,637 B2 as products of examples 1, 2, 3, 4, 5, 6, 7, 8, 9, 10 and 11, tetrakis(2,4-di-tert-butylphenyl) 4,4'-biphenylene diphosphonite, 6-isooctyloxy-2,4,8,10-tetra-tert-butyl-12H-dibenz [d,g]-1,3,2-dioxaphosphocine, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocine, 1,3,7,9-tetra-tert-butyl-11-octoxy-5H-benzo[d][1,3,2] benzodioxaphosphocine, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos 168, RTM BASF), tris(nonylphenyl) phosphite,

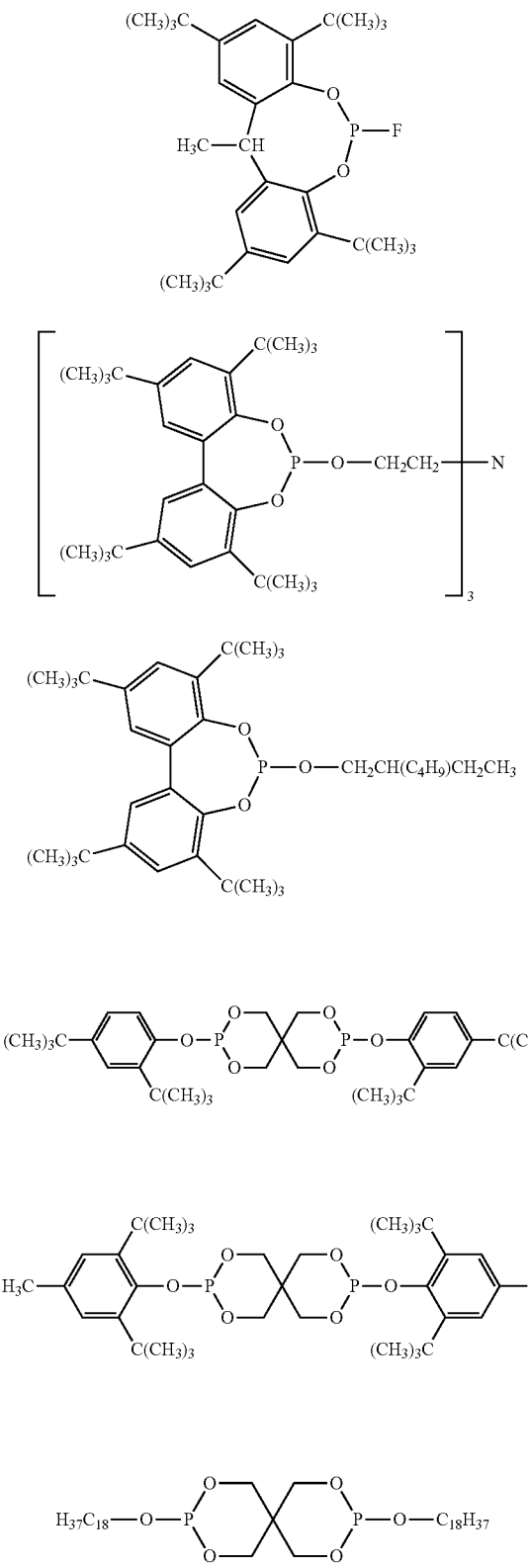

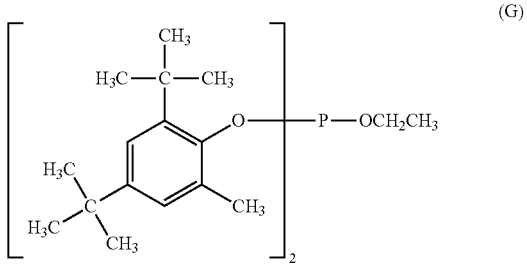

5. Hydroxylamines and amine N-oxides, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine, N,N-bis(hydrogenated rape-oil alkyl)-N-methyl-amine N-oxide or trialkylamine N-oxide.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate and pentaerythritol tetrakis-[3-(n-lauryl)-propionic acid ester].

8. Peroxide scavengers, for example esters of α-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Acid scavengers, for example melamine, polyvinylpyrrolidone, dicyandiamide, triallyl cyanurate, urea derivatives, hydrazine derivatives, amines, polyamides, alkali metal salts and alkaline earth metal salts of higher fatty acids, for example calcium stearate, zinc stearate, magnesium behenate, magnesium stearate, sodium ricinoleate and potassium palmitate, antimony pyrocatecholate and zinc pyrocatecholate.

10. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102, or 5,7-di-tert-butyl-3-(4-hydroxyphenyl)-3H-benzofuran-2-one, 5,7-di-tert-butyl-3-[4-(2-hydroxyethoxy)phenyl]-3H-benzofuran-2-one, 5,7-di-tert-butyl-3-[4-[2-[2-[2-[2-(2-hydroxyethoxy)ethoxy]ethoxy]phenyl]-3H-benzofuran-2-one, 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one, 3-(2-acetoxy-4-(1,1,3,3-tetramethyl-butyl)-phenyl)-5-(1,1, 3,3-tetramethyl-butyl)-benzofuran-2-one, [6-[6-[6-[2-[4-(5,7-di-tert-butyl-2-oxo-3H-benzofuran-3-yl)phenoxy]ethoxy]-6-oxo-hexoxy]-6-oxo-hexoxy]-6-oxo-hexyl] 6-hydroxyhexanoate, [4-tert-butyl-2-(5-tert-butyl-2-oxo-3H-benzofuran-3-yl)phenyl] benzoate, [4-tert-butyl-2-(5-tert-butyl-2-oxo-3H-benzofuran-3-yl)phenyl] 3,5-di-tert-butyl-4-hydroxy-benzoate and [4-tert-butyl-2-(5-tert-butyl-2-oxo-3H-benzofuran-3-yl)phenyl] 3-(3,5-di-tert-butyl-4-hydroxy-phenyl)propanoate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; as ionic copolymers (ionomers), Irgaclear XT 386 (RTM BASF), 1,3:2,4-bis(3',4'-dimethylbenzylidene)-sorbitol, 1,3:2,4-di(paramethyldibenzylidene)-sorbitol, 1,3:2,4-di(benzylidene)sorbitol and bis(4-propylbenzylidene) propyl sorbitol [CAS-No. 882073-43-0].

12. Fillers and reinforcing agents, for example calcium carbonate, silicates, glass fibres, glass beads, asbestos, talc, kaolin, bentonite, mica, hydrotalcite, barium sulfate, metal oxides and hydroxides, carbon black, graphite, wood flour and flours or fibers of other natural products, synthetic fibers.

13. Flame Retardants 13.1. Phosphorus containing flame retardants including reactive phosphorous containing flame retardants, for example tetraphenyl resorcinol diphosphite (Fyrolflex RDP, RTM, Akzo Nobel), tetrakis(hydroxymethyl)phosphonium sulphide, triphenyl phosphate, diethyl-N,N-bis(2-hydroxyethyl)-aminomethyl phosphonate, hydroxyalkyl esters of phosphorus acids, alkylphosphate oligomers, ammonium polyphosphate (APP), resorcinol diphosphate oligomer (RDP), phosphazene flame retardants or ethylenediamine diphosphate (EDAP).

13.2. Nitrogen containing flame retardants, for example melamine-based flame retardants, isocyanurates, polyisocyanurate, esters of isocyanuric acid, like tris-(2-hydroxyethyl)isocyanurate, tris(hydroxymethyl)isocyanurate, tris(3-hydroxy-n-propyl)isocyanurate, triglycidyl isocyanurate, melamine cyanurate, melamine borate, melamine phosphate, melamine pyrophosphate, melamine polyphosphate, melamine ammonium polyphosphate, melamine ammonium pyrophosphate, dimelamine phosphate, dimelamine pyrophosphate, benzoguanamine, allantoin, glycoluril, urea cyanurate, a condensation product of melamine from the series melem, melam, melon and/or a higher condensed compound or a reaction product of melamine with phosphoric acid or a mixture thereof.

13.3. Organohalogen flame retardants, for example polybrominated diphenyl oxide (DE-60F, Great Lakes), decabromodiphenyl oxide (DBDPO; Saytex 102E (RTM, Albemarle)), tris[3-bromo-2,2-bis(bromomethyl)propyl] phosphate (PB 370, (RTM, FMC Corp.)), tris(2,3-dibromopropyl)phosphate, chloroalkyl phosphate esters such as tris(chloropropyl)phosphate, tris(2,3-dichloropropyl)phosphate, tris(1,3-dichloro-2-propyl)phosphate (Fyrol FR 2 (RTM ICL)), oligomeric chloroalkyl phosphate, chlorendic acid, tetrachlorophthalic acid, tetrabromophthalic acid, poly-β-chloroethyl triphosphonate mixture, tetrabromobisphenol A-bis(2,3-dibromopropyl ether) (PE68), brominated epoxy resin, brominated aryl esters, ethylene-bis(tetrabromophthalimide) (Saytex BT-93 (RTM, Albemarle)), bis(hexachlorocyclopentadieno) cyclooctane (Declorane Plus (RTM, Oxychem)), chlorinated paraffins, octabromodiphenyl ether, hexachloro-cyclopentadiene derivatives, 1,2-bis(tribromophenoxy)ethane (FF680), tetrabromobisphenol A (Saytex RB100 (RTM, Albemarle)), ethylene bis-(dibromonorbornanedicarboximide) (Saytex BN-451 (RTM, Albemarle)), bis-(hexachlorocycloentadeno)cyclooctane, PTFE, tris (2,3-dibromopropyl) isocyanurate or ethylene-bis-tetrabromophthalimide.

Some of the halogenated flame retardants mentioned above are routinely combined with an inorganic oxide synergist. Some of the halogentated flame retardants mentioned above can be used in combination with triaryl phosphates (such as the propylated, butylated triphenyl phosphates) and the like and/or with oligomeric aryl phosphates (such as resorcinol bis(diphenyl phosphate), bisphenol A bis(diphenyl phosphate), neopentylglycol bis(diphenyl phosphate)) and the like.

13.4. Inorganic flame retardants, for example aluminium trihydroxide (ATH), boehmite (AlOOH), magnesium dihydroxide (MDH), zinc borates, $CaCO_3$, organically modified layered silicates, organically modified layered double hydroxides, and mixtures thereof. In regard to the synergistic combination with halogenated flame retardants, the most common inorganic oxide synergists are zinc oxides, antimony oxides like $Sb_2O_3$ or $Sb_2O_5$ or boron compounds.

14. Other additives, for example plasticisers, lubricants, rheology additives, catalysts, flow-control agents, optical brighteners, antistatic agents and blowing agents.

Suitable as component (d) is also a mixture of further additives.

Preferred is a composition, which comprises additionally
(d) a further additive.

Preferred is a composition, which comprises as component (d) a further additive, which is an antioxidant, which is different to a compound of formula I as well as different to a compound of formula II, an UV absorber, a hindered amine light stabilizer, a metal deactivator, a phosphite or phosphonite, a hydroxylamine or amine N-oxide, a thiosynergist, a peroxide scavenger, a benzofuranone or indolinone, or a flame retardant.

Preferred is a composition, which comprises
(d) a further additive, which is a phosphite, a benzofuran-2-one or an aromatic amine.

Preferably, a benzofuran-2-one is a compound of the formula V

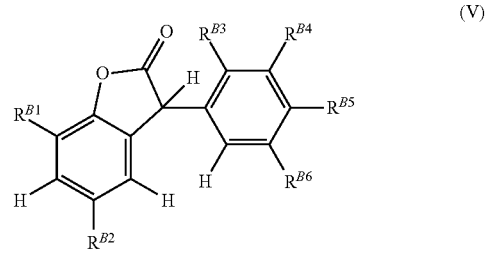

wherein
$R^{B1}$ is hydrogen or $C_1$-$C_8$ alkyl,
$R^{B2}$ is $C_1$-$C_{12}$ alkyl,
$R^{B3}$ is hydrogen, $C_1$-$C_4$ alkyl or $C_2$-$C_8$ alkanoyloxy,
$R^{B4}$ is hydrogen or $C_1$-$C_8$ alkyl; or $R^{B3}$ and $R^{B4}$ or $R^{B4}$ and $R^{B5}$ together with the carbon atoms to which they are attached form a $C_6$-$C_8$ cycloalkylene ring,
$R^{B5}$ is hydrogen, $C_1$-$C_4$ alkyl or $C_1$-$C_4$ alkoxy, and
$R^{B6}$ is hydrogen or $C_1$-$C_{12}$ alkyl.

C$_2$-C$_8$alkanoyloxy is for example acetoxy (=acetyloxy=H$_3$C—CO—O—), propionyloxy, butanoyloxy, pentanoyloxy, hexanoyloxy, heptanoyloxy or octanoyloxy. Acetoxy is preferred.

Several of the compounds of the formula V are known in the literature and some are disclosed for example in U.S. Pat. No. 5,516,920.

Especially preferred benzofuran-2-one stabilizers are for example 5,7-ditert-butyl-3-phenyl-benzofuran-2-one; 5,7-ditert-butyl-3-(3,4-dimethylphenyl)-benzofuran-2-one; 5,7-ditert-butyl-3-(2,3-dimethylphenyl)-benzofuran-2-one, 5,7-ditert-butyl-3-(4-methoxyphenyl)-benzofuran-2-one, 5-tert-octyl-3-(2-acetoxy-5-tert-octylphenyl)benzofuran-2-one. Technical grades of 5,7-ditert-butyl-3-(3,4-dimethylphenyl) benzofuran-2-one often contain also the isomeric 5,7-ditert-butyl-3-(2,3-dimethylphenyl)-benzofuran-2-one and vice versa.

Preferred is a composition, which comprises
(d) a further additive, which is a phosphite, a benzofuran-2-one, which is a compound of formula V, or an aromatic amine.

Preferred is a composition, which comprises
(d) a further additive, which is a benzofuran-2-one, which is a compound of formula V, in particular which is 5-tert-octyl-3-(2-acetoxy-5-tert-octylphenyl)benzofuran-2-one or 5,7-ditert-butyl-3-(3,4-dimethylphenyl)-3H-benzofuran-2-one, very particular 5,7-ditert-butyl-3-(3,4-dimethylphenyl)-3H-benzofuran-2-one.

Preferred is a composition, which comprises
(d) a further additive, which is a phosphite, in particular bis(2,4-ditert-butyl-6-methyl-phenyl) ethyl phosphite or bis-(2,4-ditert-butylphenol) pentaerythritol diphosphite, very particular bis(2,4-ditert-butyl-6-methyl-phenyl) ethyl phosphite.

Preferred is a composition, which comprises
(d) a further additive, which is an aromatic amine, in particular a technical mixture obtained by the reaction of diphenylamine with diisobutylene.

Preferred is a composition, which comprises
(d) a further additive, which is 5-tert-octyl-3-(2-acetoxy-5-tert-octylphenyl)benzofuran-2-one, 5,7-ditert-butyl-3-(3,4-dimethylphenyl)-3H-benzofuran-2-one, bis(2,4-ditert-butyl-6-methyl-phenyl) ethyl phosphite, bis-(2,4-ditert-butylphenol) pentaerythritol diphosphite or a technical mixture obtained by the reaction of diphenylamine with diisobutylene.

Preferred is a composition, which comprises
(d) a further additive, which is 5-tert-octyl-3-(2-acetoxy-5-tert-octylphenyl)benzofuran-2-one, 5,7-ditert-butyl-3-(3,4-dimethylphenyl)-3H-benzofuran-2-one, bis(2,4-ditert-butyl-6-methyl-phenyl) ethyl phosphite or a technical mixture obtained by the reaction of diphenylamine with diisobutylene.

Preferred is a composition, which comprises
(a) an organic material susceptible to oxidative, thermal or light-induced degradation, which is a polyether polyol, a polyester polyol or a polyurethane,
(b) a bisphenolic stabilizer of formula I, which is obtainable by the transesterification of methyl-(3,5-ditert-butyl-4-hydroxy-phenyl)propanoate with polyethylene 200,
(c) a chromanol stabilizer of formula II,
(d) a further additive, which is 5-tert-octyl-3-(2-acetoxy-5-tert-octylphenyl)benzofuran-2-one, 5,7-ditert-butyl-3-(3,4-dimethylphenyl)-3H-benzofuran-2-one, bis(2,4-ditert-butyl-6-methyl-phenyl) ethyl phosphite or a technical mixture obtained by the reaction of diphenylamine with diisobutylene.

Preferably, the combined amount of the bisphenolic stabilizer of formula I as component (b), the chromanol stabilizer of formula II as component (c) and the further additive as component (d) is in the range from 0.1% to 10% by weight based on the weight of the organic material as component (a). In particular, the combined amount is in the range from 0.2% to 5% by weight, very particular in the range from 0.3% to 1.5% by weight and especially in the range from 0.35% to 0.7% by weight.

Preferred is a composition, wherein the combined amount of the bisphenolic stabilizer of formula I as component (b), the chromanol stabilizer of formula II as component (c) and the further additive as component (d) is in the range from 0.1% to 10% by weight based on the weight of the organic material as component (a).

Preferably, the weight ratio of the bisphenolic stabilizer of formula I as component (b) to the further additive as component (d) is between 0.9 and 11. As an example, a weight ratio of 0.9 represents 1 part by weight of the bisphenolic stabilizer of formula I as component (b) and 1.1 parts by weight of the chromanol stabilizer of formula II as component (c). As a further example, a weight ratio of 11 represents 1 part by weight of the bisphenolic stabilizer of formula I as component (b) and 0.09 parts by weight of the chromanol stabilizer of formula II as component (c). Very particular, the weight ratio is between 0.95 and 8, especially between 1 and 5 and very especially between 2 and 4.

Preferred is a composition, wherein the weight ratio of the bisphenolic stabilizer of formula I as component (b) to the further additive as component (d) is between 1 and 0.08.

Preferred is a composition, wherein the combined amount of the bisphenolic stabilizer of formula I as component (b) and the further additive as component (d) is in the range from 0.2% to 5% by weight based on the weight of the organic material as component (a), in particular from 0.3% to 1.5% by weight, and wherein the weight ratio of the bisphenolic stabilizer of formula I as component (b) to the further additive as component (c) is between 0.95 and 8.

Preferred is a composition, wherein
the combined amount of the bisphenolic stabilizer of formula I as component (b) and the chromanol stabilizer of formula II as component (c) is in the range from 0.2% to 5% by weight based on the weight of the organic material as component (a), in particular from 0.3% to 1.5% by weight, and
the combined amount of the bisphenolic stabilizer of formula I as component (b) and the chromanol stabilizer of formula II as component (c) is in the range from 0.2% to 5% by weight based on the weight of the organic material as component (a), in particular from 0.3% to 1.5% by weight.

Preferred is a composition, wherein
the combined amount of the bisphenolic stabilizer of formula I as component (b) and the chromanol stabilizer of formula II as component (c) is in the range from 0.2% to 5% by weight based on the weight of the organic material as component (a), in particular from 0.3% to 1.5% by weight,
the weight ratio of the bisphenolic stabilizer of formula I as component (b) to the chromanol stabilizer of formula II as component (c) is between 0.9 and 11, in particular between 0.95 and 8,
the combined amount of the bisphenolic stabilizer of formula I as component (b) and the further additive as component (d) is in the range from 0.2% to 5% by weight based on the weight of the organic material as component (a), in particular from 0.3% to 1.5% by weight, and the weight ratio of the bisphenolic stabilizer of formula I as component (b) to the further additive as component (c) is between 0.95 and 8.

In case of polyurethane as component (a), it is possible that the composition is a part of a shaped article or the complete shaped article.

Examples such a shaped article are:

I-1) Floating devices, marine applications, plastic lumber for decks, boats, oars.

I-2) Automotive applications, in particular bumpers, dashboards, rear and front linings, moldings parts under the hood, hat shelf, trunk linings, interior linings, air bag covers, electronic moldings for fittings (lights), panes for dashboards, instrument panel, exterior linings, upholstery, automotive lights, interior and exterior trims; door panels; glazing front side; seat backing, exterior panels, wire insulation, profile extrusion for sealing, cladding, pillar covers, chassis parts, body side mouldings, convertible tops, exterior trim, fasteners/fixings, front end module, hinges, luggage/roof racks, pressed/stamped parts, seals, side impact protection, sound deadener/insulator and sunroof.

I-3) Devices for plane including furnishings, railway including furnishings.

I-4) Devices for architecture and design, acoustic quietized systems, shelters.

II-1) Appliances, cases and coverings in general and electric/electronic devices (personal computer, telephone, portable phone, printer, television-sets, audio and video devices), panel devices.

II-2) Jacketing for other materials such as steel or textiles, for example cable-jacketing.

II-3) Electric appliances, in particular washing machines, tumblers, ovens (microwave oven), dish-washers, mixers, and irons.

II-4) Foils for condensers, refrigerators, heating devices, air conditioners, encapsulating of electronics, semi-conductors, coffee machines, and vacuum cleaners.

III-1) Rotor blades, ventilators and windmill vanes, swimming pool covers, pool liners, pond liners, closets, wardrobes, dividing walls, slat walls, folding walls, roofs, shutters (e.g. roller shutters), fittings, connections between pipes, sleeves, and conveyor belts.

III-2) Sanitary articles and pipes.

VI-1) Food packing and wrapping (flexible and solid), bottles.

VII-1) Extrusion coating (photo paper, tetrapack, pipe coating), household articles of any kind (e.g. appliances, thermos bottle/clothes hanger).

VII-2) Furniture in general, foamed articles (cushions, mattresses, impact absorbers), foams, sponges, dish clothes, mats, building kits (boards/figures/balls).

VII-3) Footwear (shoes/shoe-soles), insoles, spats, adhesives, structural adhesives, labels for bottles, couches, artificial joints (human), printing plates (flexographic), printed circuit boards.

Preferred is an article, which is a foam, in particular a flexible foam.

The above described preferences in for an organic material susceptible to oxidative, thermal or light-induced degradation as component (a), for a bisphenolic stabilizer of formula I as component (b), for a chromanol stabilizer of formula II as component (c) and optionally a further stabilizer as component (d) are described for a composition. These preferences apply also to the further embodiments of the invention. At these further embodiments, the optional presence of a further additive as component (d) is also included.

A further embodiment of the invention relates to a process for manufacturing a composition, which comprises the steps of (i) incorporating a bisphenolic stabilizer of formula I

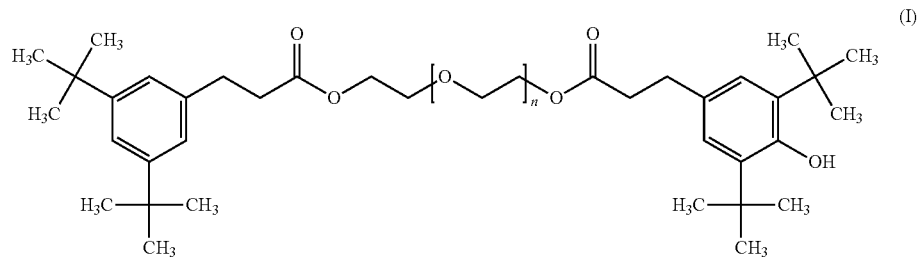

wherein n is 1, 2, 3, 4, 5, 6, 7, 8, 9, 10 or 11 as component (b) and a chromanol stabilizer of formula II

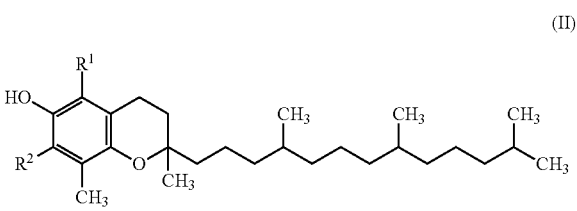

wherein $R^1$ and $R^2$ are independently of each other H or $C_1$-alkyl as component (c) or an additive mixture, which comprises the bisphenolic stabilizer of formula I as component (b) and the chromanol stabilizer of formula II as component (c), into an organic material susceptible to oxidative, thermal or light-induced degradation, which is a polyether polyol, a polyester polyol or a polyurethane as component (a).

The component (b), the component (c) and optionally the component (d) can be added to the component (a) either individually or as an additive mixture comprising component (b), component (c) and optionally component (d).

Incorporation of the individual components or the additive mixture is for example carried out in a processing apparatus, in particular a heatable container equipped with a stirrer, which can preferably be closed. A heatable container equipped with a stirrer is for example a kneader, extruder, mixer or stirred vessel, in particular a single-screw extruder, a contrarotating twin-screw extruder, a corotating twin-screw extruder, a planetary-gear extruder, a ring extruder or a co-kneader. In the case of manufacturing a polyurethane foam, it is possible to add the individual components or the additive mixture into a mixing head, i.e. a specific type of mixer, where the other ingredients and starting materials are dosed. It is also possible to use a processing apparatus, which contains at least one gas removal compartment to which a vacuum can be applied and/or which can be set under an atmosphere, wherein the oxygen content is low or oxygen is absent. In case of a polyurethane, which is polymerized by reaction of starting materials comprising a liquid polyol as a starting material, in particular a liquid polyether polyol or a polyester polyol, an incorporation into the polyol prior to the polycondensation of the polyol with an isocyanurate as another starting material is possible.

A further embodiment of the invention relates to a use of an additive mixture, which comprises a bisphenolic stabilizer of formula I

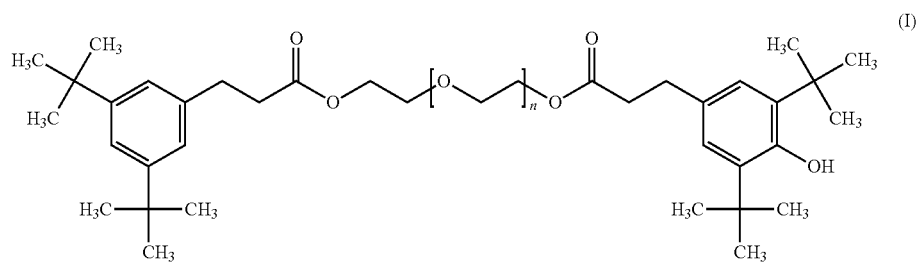

(I)

wherein
n is 1, 2, 3, 4, 5, 6, 7, 8, 9, 10 or 11 as component (b) and
a chromanol stabilizer of formula II

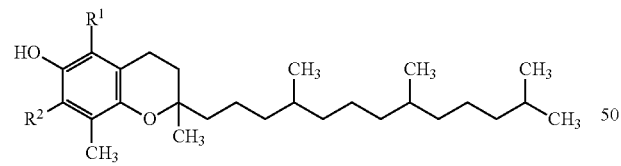

(II)

wherein
$R^1$ and $R^2$ are independently of each other H or $C_1$-alkyl as component (c), for protecting an organic material susceptible to oxidative, thermal or light-induced degradation, which is a polyether polyol, a polyester polyol or a polyurethane against degradation.

Preferred is a use of the additive mixture for protecting the organic material, which is a polyurethane, against yellowing.

Preferred is the use of the additive mixture for stabilizing a foam, which contains polyurethane, against scorching.

Processing of the organic material as component (a) is characterized by a short-term exposure of the component (a) to heat, for example to a temperature in the range of 150° C.

to 340° C., during the time of processing of component (a). The time of processing is short in comparison to for example the possible time of usage. Usage takes typically place at a temperature, for example 0° C. to 50° C., which is below the temperature during processing.

Preferred is the use of the additive mixture for stabilizing the organic material against oxidative or thermal degradation during processing.

Preferred is the use of the additive mixture for protecting the organic material, which is a polyether polyol or a polyester polyol, especially a polyether polyol, against degradation by oxygen at a temperature between 100° C. and 340° C.

A further embodiment of the invention relates to an additive mixture, which comprises the components
(b) a bisphenolic stabilizer of formula I

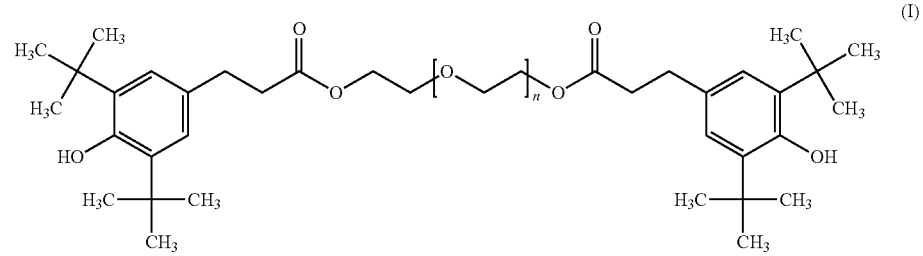

wherein
n is 1, 2, 3, 4, 5, 6, 7, 8, 9, 10 or 11; and
(c) a chromanol stabilizer of formula II

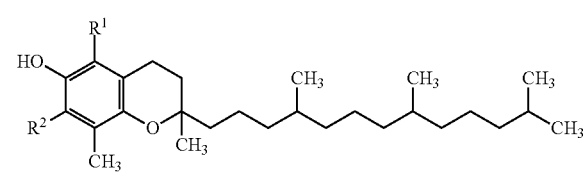

wherein
$R^1$ and $R^2$ are independently of each other H or $C_1$-alkyl.

Preferred is an additive mixture, which comprises additionally
(d) a further additive.

A simplified handling of the additive mixture is possible, if the additive mixture is in the liquid state at a temperature of 25° C. and a pressure of 101.3 kPa. The individual components of the additive mixture determine its physical state. In case of the combination of a liquid component (b), a liquid component (c) and optionally a liquid component (d), an additive mixture in the liquid state likely results. In case that one or more but not all components are themselves in the liquid state, the ratio of the components determines the physical form of the additive mixture. In such a case and in case, all components are in a solid state at a temperature of 25° C. and a pressure of 101.3 kPa, an auxiliary ingredient as a further component of the additive mixture is possible, for example in an amount of 10% to 50% by weight. The auxiliary ingredient itself is in a liquid state and is added at least in an amount that leads to a liquid state of the additive mixture. The auxiliary ingredient is for example a high-boiling solvent, preferably an alcohol, in particular a polyol. In case of a polyurethane, a polyol as the auxiliary ingredient will afterwards covalently incorporated if the additive mixture is added to the starting materials for the polymerization resulting in the polyurethane. In case of an organic material as component (a), which is itself liquid, a small part of the organic material can be used to liquefy an otherwise solid additive mixture. It is understood that the auxiliary ingredient also serves to adjust the viscosity of the additive mixture if that is necessary.

An auxiliary ingredient, which is in the liquid state at a temperature of 25° C. and a pressure of 101.3 kPa, is for example a polypropylene glycol with a molecular weight of 450 (a commercially available material being Lupranol 1200 [RTM BASF]), polyethylene glycol 300, polyethylene glycol 200, a trifunctional polyether polyol containing predominantly secondary hydroxyl groups, which is in the liquid state at a temperature of 25° C. and a pressure of 101.3 kPa (a commercially available material being Lupranol 2074 [RTM BASF]), or a copolymer of propylene oxide and ethylene oxide, which copolymer is in the liquid state at a temperature of 25° C. and a pressure of 101.3 kPa. A mixture of the aforementioned materials as an auxiliary ingredient is also possible.

An additive mixture, which is in the liquid state at a temperature of 25° C. and a pressure of 101.3 kPa, contains for example 55% by weight of a material as obtained from example 1a of WO 2010/003813 A1, 15% by weight of vitamin E and 30% by weight of Lupranol 1200. The aforementioned amount of Lupranol 1200 can be replaced by Lupranol 2074, polyethylene glycol 300, polyethylene glycol 200, or a copolymer of propylene oxide and ethylene oxide, which copolymer is in the liquid state at a temperature of 25° C. and a pressure of 101.3 kPa. This example of an additive mixture provides good stabilization of an organic material susceptible to oxidative, thermal or light-induced degradation, which is a polyether polyol, a polyester polyol or a polyurethane, in a composition with the organic material. The preferences, which are aforementioned for a composition of components (a), (b) and (c), refer in particular to the example if applicable as a further specification of the example. Especially, a further additive, i.e. aforementioned component (d), can be added to the composition of the example as a further additive mixture itself and in a composition of component (a) and the example of an additive mixture.

In case of an additive mixture in solid state at a temperature of 25° C. and a pressure of 101.3 kPa, a physical form of the additive mixture is for example a powder or a pellet.

The invention is illustrated by the non-limiting examples below.

EXPERIMENTAL PART

Unless the context suggests otherwise, percentages are always by weight. A reported content is based on the content in aqueous solution or dispersion if not stated otherwise.
Stabilizers

Example S-1

Transesterification of 3-(3,5-di-tert-butyl-4-hydroxyphenyl)-propionic Acid Methyl Ester with Polyethylene Glycol 200

As described in example 1a of WO 2010/003813 A1, 77 g of cylcohexane is added under stirring at 400 rpm to 97.7 g of polyethylene glycol PEG 200 in a 750 ml glass polymerization reactor, equipped with cooling traps, and pre-heated to 80° C. Within 30 minutes, the temperature is raised to 120° C. The cyclohexane/water mixture is distilled off into the cooling trap. The temperature is decreased to 100° C., and the reactor purged with Argon. Then 339.4 g of molten 3-(3,5-di-tert-butyl-4-hydroxyphenyl)propionic acid methyl ester [Metilox] is added at 95° C. (internal temperature). Afterwards 3.16 g of aluminum catalyst (Manalox 30 A, aluminum-triisopropylate) is injected. The reaction mixture is kept under vacuum (4-280 mbar) at 100-190° C. for 5-6 hours. Afterwards excess metilox is distilled of while stirring at 400 rpm at 210° C. and 0.5 mbar. Then 6.24 g of citric acid (50%) is added at 75° C. The reaction mixture is stirred for 15 minutes at 300 rpm. Additional 130 ml water and, subsequently, 260 ml cyclohexane is added, and the reaction mixture stirred for 30 minutes at 300 rpm. The organic phase is separated from the aqueous phase, and cyclohexane distilled off. The end product is characterized by HPLC and contains less than 1.4% Metilox, and less than 0.5% polyethylene glycol. The viscosity of the end product at 20° C. is 245'000 mPas (AR-2000N cone/plate rheometer: 40 mm 2° steel cone with Peltier plate, constant 10 Pa shear stress).

The product obtained at example S-1 contains a molecule, which is depicted below.

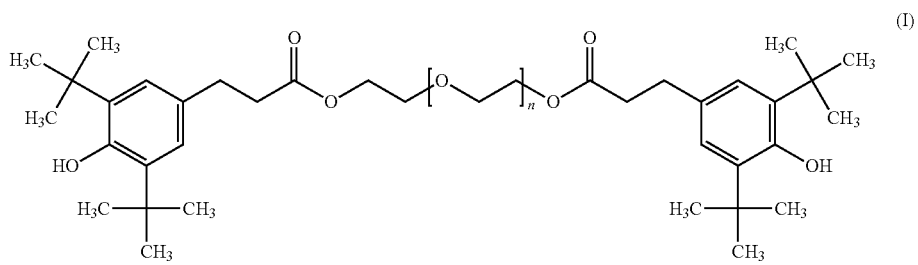

(I)

n = 3

Irganox E 201 (RTM BASF) is a commercially available vitamin E. It is a phenolic antioxidant and contains 2,5,7,8-tetramethyl-2-[4,8,12-trimethyltridecyl]chroman-6-ol, which is depicted below:

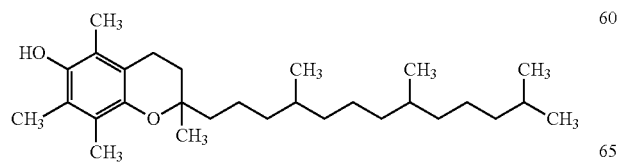

Irganox 1135 (RTM BASF) is a phenolic antioxidant and contains 3-(3,5-di-tert-butyl-4-hydroxy-phenyl)-propionic acid iso-octyl ester, which is depicted below:

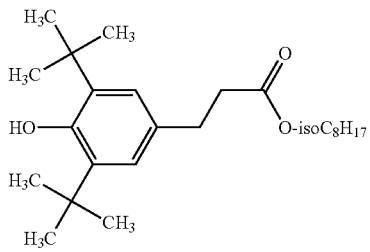

Irganox 1076 (RTM BASF) is a phenolic antioxidant and contains 3-(3,5-di-tert-butyl-4-hydroxy-phenyl)-propionic acid stearyl ester, which is depicted below:

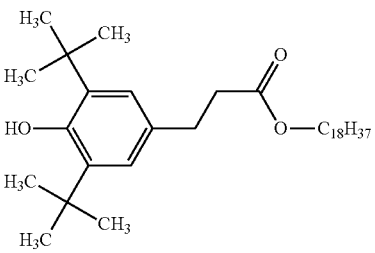

AO-1 is a phenolic antioxidant available according to example 2a or 2b of EP 0406169 B1 and contains 2-(1-methyl-pentadecyl)-4,6-dimethyl-phenol, which is depicted below:

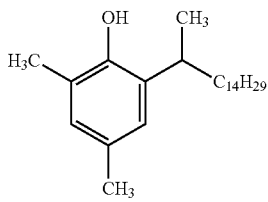

Irganox 5057 (RTM BASF) is an aminic antioxidant and is a technical mixture obtained by the reaction of diphenylamine with diisobutylene, comprising
α) diphenylamine;
β) 4-tert-butyldiphenylamine;
χ) compounds of the group
  i) 4-tert-octyldiphenylamine,
  ii) 4,4'-di-tert-butyldiphenylamine,
  iii) 2,4,4'-tris-tert-butyldiphenylamine,
δ) compounds of the group
  i) 4-tert-butyl-4'-tert-octyldiphenylamine,
  ii) o,o', m,m', or p,p'-di-tert-octyldiphenylamine,
  iii) 2,4-di-tert-butyl-4'-tert-octyldiphenylamine,
ε) compounds of the group
  i) 4,4'-di-tert-octyldiphenylamine,
  ii) 2,4-di-tert-octyl-4'-tert-butyldiphenylamine, and
wherein not more than 5% by weight of component α), 8 to 15% by weight of component β), 24 to 32% by weight of component χ), 23 to 34% by weight of component δ) and 21 to 34% by weight of component ε) are present.

Irgafos 38 (RTM BASF) is a phosphite and contains bis(2,4-ditert-butyl-6-methyl-phenyl) ethyl phosphite, which is depicted below:

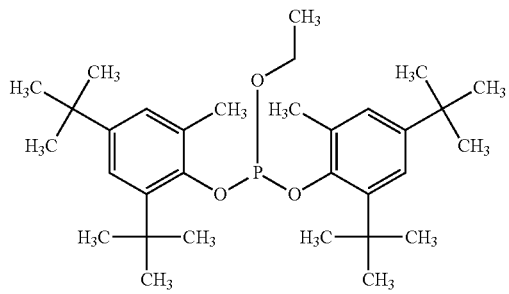 [SMILES: CCOP(Oc1c(C)cc(C(C)(C)C)cc1C(C)(C)C)Oc1c(C)cc(C(C)(C)C)cc1C(C)(C)C]

AO-2 is a benzofuran-2-one stabilizer obtainable according to EP 0871066 A1 with its compound I-30 and contains [2-[2-oxo-5-(1,1,3,3-tetramethylbutyl)-3H-benzofuran-3-yl]-4-(1,1,3,3-tetramethylbutyl)phenyl] acetate (alternative name: 5-tert-octyl-3-(2-acetoxy-5-tert-octylphenyl)-benzofuran-2-one), which is depicted below:

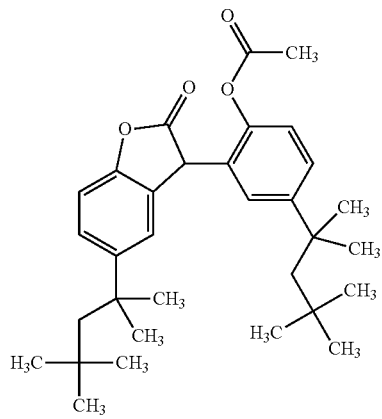 [SMILES: CC(=O)Oc1ccc(C(C)(C)CC(C)(C)C)cc1C1C(=O)Oc2ccc(C(C)(C)CC(C)(C)C)cc21]

AO-3 is a benzofuran-2-one stabilizer obtainable according to GB 2281910 A1 with its compound 103 and contains 5,7-ditert-butyl-3-(3,4-dimethylphenyl)-3H-benzofuran-2-one, which is depicted below:

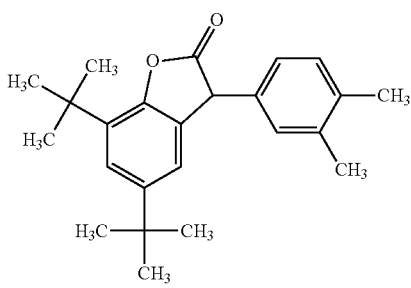 [SMILES: Cc1ccc(C2C(=O)Oc3c2cc(C(C)(C)C)cc3C(C)(C)C)cc1C]

The other used materials are commercially available for example from Aldrich Inc. or BASF SE.

Application

Example A-1

Stabilization of a Polyurethane Soft Foam Based on a Polyether Polyol

Preparation of Polyurethane Soft Foams Polyether Based on a Polyether Polyol:

0.71 g of a stabilizer or a composition of stabilizers (0.45 parts based on 100 parts of polyol) as depicted in table T-A-1 is dissolved in 157.1 g of a trifunctional polyether polyol (predominantly containing secondary hydroxyl groups, number average molecular weight of 3000 D, OH number=48, free of a stabilizer). 9.84 g of a solution consisting of 1.88 g Tegostab BF 2370 (RTM Evonik Industries; surfactant based on polysiloxane), 0.24 g Tegoamin 33 (RTM Evonik Industries; general purpose gelling catalyst based on triethylene diamine) and 7.7 g of deionized water are added and the reaction mixture is stirred vigorously for 10 seconds at 2600 rpm. 0.31 g Kosmos 29 (RTM Evonik Industries; catalyst based on stannous octoate) is then added and the reaction mixture is again stirred vigorously for 18 seconds at 2600 rpm. 92.2 g of isocyanate TDI 80 (mixture containing 80% toluylene-2,4-diisocyanate and 20% toluylene-2,6-diisocyanate isomers) is then added with continuous stirring for 5 to 7 seconds at 2600 rpm. The mixture is then poured into a 20×20×20 cm cake-box and an exothermic foaming reaction takes place as indicated by an increase of temperature. The foam blocks are cooled and stored at room temperature for 24 hours. All prepared foam blocks show a comparable initial white colour.

Anti-scorch Testing:

Scorch resistance is determined by dynamic heat aging, i.e. dynamic alu-block test. The foam blocks are cut into thin tubes (2 cm thick, 1.5 cm in diameter). From each foam block, a thin tube is taken as a foam sample. The foam sample is heated in an aluminum block. The temperature is kept for 30 min at a temperature of 200° C.

The scorch resistance is assessed by measuring the colour of the foam sample after aging. The measured colour is reported in terms of Yellowness Index (YI) determined on the foam sample in accordance with the ASTM 1926-70 Yellowness Test. Low YI values denote little discoloration, high YI values severe discoloration of the samples. The whiter a foam sample remains, the better the foam sample is stabilized. The results are depicted in table T-A-1.

TABLE T-A-1 results of dynamic alublock ageing of polyurethane soft foams

| foam No. | stabilizer or stabilizer composition (added parts based on 100 parts polyether polyol) | YI after 30 min exposure at 200° C. |
|---|---|---|
| A-1-1[a] | no stabilizer added | 52.2 |
| A-1-2[a] | 0.45 parts of product obtained in example S-1 | 32.3 |
| A-1-3[a] | 0.45 parts of Irganox E 201 | 43.5 |
| A-1-4[b] | 0.225 parts of product obtained in example S-1 and 0.225 parts of Irganox E 201 [1:1][c] | 27.6 |
| A-1-5[b] | 0.35 parts of product obtained in example S-1 and 0.10 parts of Irganox E 201 [1:0.29][c] | 25.1 |
| A-1-6[b] | 0.405 parts of product obtained in example S-1 and 0.045 parts of Irganox E 201 [1:0.11][c] | 26.3 |
| A-1-7[a] | 0.35 parts of Irganox 1135 and 0.1 parts of Irganox E 201 [1:0.29][c] | 30.4 |
| A-1-8[a] | 0.35 parts of Irganox 1076 and 0.1 parts of Irganox E 201 [1:0.29][c] | 28.5 |
| A-1-9[a] | 0.35 parts of AO-1 and 0.1 parts of Irganox E 201 [1:0.29][c] | 37.7 |

Footnotes:
[a] comparative
[b] according to the invention
[c] relative ratio of stabilizers with the stabilizer in largest amount being set to 1

The data depicted in the table T-A-1 show that there is an absolute synergism, i.e. a better result versus each single stabilizer, for a combination of the product obtained in example S-1 and Irganox E 201 at a ratio of 1:1 (foam No. A-1-4), at a ratio of 1:0.29 (foam No. A-1-5) and at a ratio of 1:0.11 (foam No. A-1-6) in comparison to the product obtained in example S-1 (foam No. A-1-2) or Irganox E 201 (foam No. A-1-3). The combination of the product obtained in example S-1 and Irganox E 201 at a ratio of 1:0.29 (foam No. A-1-5) performs better than the combination of Irganox 1135 and Irganox E 201 at a ratio of 1:0.29 (foam No. A-1-7), the combination of Irganox 1076 and Irganox E 201 at a ratio of 1:0.29 (foam No. A-1-8) and the combination of AO-1 and Irganox E 201 at a ratio of 1:0.29 (foam No. A-1-9).

Example A-2

Stabilization of a Polyether Polyol

Preparation of a Stabilized Polyether Polyol:

0.45 g of a stabilizer or a composition of stabilizers (0.45 parts based on 100 parts of polyol) as depicted in table T-A-2 is dissolved in 100 g of a trifunctional polyether polyol (predominantly containing secondary hydroxyl groups, a number average molecular weight of 3000 D, OH number=48, free of a stabilizer).

Oxidation Resistance Testing:

The oxidation resistance of the obtained stabilized polyether polyol samples is determined by differential scanning calorimetry (DSC). A sample is heated starting at 50° C. with a heating rate of 5° C./min under oxygen until 200° C. is reached. The appearance of an exothermic peak indicates the beginning of a thermo-oxidative reaction. The temperature at the onset of the exothermic peak is noted. A better stabilized sample is characterized by a higher temperature for the onset. The results are depicted in table T-A-2.

TABLE T-A-2 oxidation resistance of stabilized polyether polyols

| stabilized polyether polyol No. | stabilizer or stabilizer composition (added parts based on 100 parts polyether polyol) | onset temperature [° C.] |
|---|---|---|
| A-2-1[a] | no stabilizer added | 128 |
| A-2-2[a] | 0.45 parts of product obtained in example S-1 | 178 |
| A-2-3[a] | 0.45 parts of Irganox E 201 | 204 |
| A-2-4[b] | 0.225 parts of product obtained in example S-1 and 0.225 parts of Irganox E 201 [1:1][c] | 206 |
| A-2-5[b] | 0.35 parts of product obtained in example S-1 and 0.10 parts of Irganox E 201 [1:0.29][c] | 204 |

TABLE T-A-2-continued oxidation resistance of stabilized polyether polyols

| stabilized polyether polyol No. | stabilizer or stabilizer composition (added parts based on 100 parts polyether polyol) | onset temperature [° C.] |
|---|---|---|
| A-2-6[b)] | 0.405 parts of product obtained in example S-1 and 0.045 parts of Irganox E 201 [1:0.11][c)] | 192 |
| A-2-7[a)] | 0.35 parts of Irganox 1135 and 0.10 parts of Irganox E 201 [1:0.29][c)] | 198 |
| A-2-8[a)] | 0.35 parts of Irganox 1076 and 0.10 parts of Irganox E 201 [1:0.29][c)] | 194 |
| A-2-9[a)] | 0.35 parts of AO-1 and 0.10 parts of Irganox E 201 [1:0.29][c)] | 194 |

Footnotes:
[a)] comparative
[b)] according to the invention
[c)] relative ratio of stabilizers with the stabilizer in largest amount being set to 1

The data depicted in the table T-A-2 show that there is an absolute synergism, i.e. a better result versus each single stabilizer, for a combination of the product obtained in example S-1 and Irganox E 201 at a ratio of 1:1 (stabilized polyether polyol No. A-2-4), in comparison to the product obtained in example S-1 (stabilized polyether polyol No. A-2-2) or Irganox E 201 (stabilized polyether polyol No. A-2-3);

that there is a relative synergism, i.e. a better result versus the one mathematically expected by an assumed linearity, for a combination of the product obtained in example S-1 and Irganox E 201 at a ratio of 1:0.29 (stabilized polyether polyol No. A-2-5/mathematically expected: (1×178° C.+0.29×204° C.)/1.29=184° C.) and at a ratio of 1:0.11 (stabilized polyether polyol No. A-2-6/mathematically expected: (1×178° C.+0.11× 204° C.)/1.11=181° C.);

that the combination of the product obtained in example S-1 and Irganox E 201 at a ratio of 1:0.29 (stabilized polyether polyol No. A-2-5) performs better than the combination of Irganox 1135 and Irganox E 201 at a ratio of 1:0.29 (stabilized polyether polyol No. A-2-7), the combination of Irganox 1076 and Irganox E 201 at a ratio of 1:0.29 (stabilized polyether polyol No. A-2-8) and the combination of 2,4-dimethyl-6-(1-methyl-pentadecyl)phenol and Irganox E 201 at a ratio of 1:0.29 (stabilized polyether polyol No. A-2-9).

Example A-3

Stabilization of a Polyurethane Soft Foam Based on a Polyether Polyol

The stabilizer or stabilizer composition stated in table T-A-3 are applied in the polyurethane soft foam preparation as described in example A-1. The scorch resistance is determined as described in example A-1. The results are depicted in table T-A-3.

TABLE T-A-3 results of dynamic alublock ageing of polyurethane soft foams

| foam No. | stabilizer or stabilizer composition (added parts based on 100 parts polyether polyol) | Yl after 30 min exposure at 200° C. |
|---|---|---|
| A-3-1[b)] | 0.326 parts of product obtained in example S-1, 0.093 parts of Irganox E 201 [1:0.29][c)] | 25.5 |
| A-3-2[b)] | 0.326 parts of product obtained in example S-1, 0.093 parts of Irganox E 201 and 0.031 of parts Irganox 5057 [1:0.29:0.10][c)] | 19.2 |
| A-3-3[b)] | 0.326 parts of product obtained in example S-1, 0.093 parts of Irganox E 201 and 0.031 parts of Irgafos 38 [1:0.29:0.10][c)] | 24.1 |
| A-3-4[b)] | 0.326 parts of product obtained in example S-1, 0.093 parts of Irganox E 201 and 0.031 parts of AO-2 [1:0.29:0.10][c)] | 21.3 |
| A-3-5[b)] | 0.326 parts of product obtained in example S-1, 0.093 parts of Irganox E 201 and 0.031 parts of AO-3 [1:0.29:0.10][c)] | 19.2 |

Footnotes:
[a)] comparative
[b)] according to the invention
[c)] relative ratio of stabilizers with the stabilizer in largest amount being set to 1

The data depicted in the table T-A-3 show that the results can be further improved veat an overall similar amount of stabilizers by addition of a third stabilizer, i.e. a better re-suit by addition of Irganox 5057 (foam No. A-3-2), a better result by addition of Irgafos 38 (foam No. A-3-3), a better result by addition of AO-2 (foam No. A-3-4) and a better result by addition of AO-3 (foam No. A-3-5).

The invention claimed is:

1. A composition, comprising
   (a) an organic material susceptible to oxidative, thermal or light-induced degradation, which is a polyether polyol or a polyurethane formed front a polyether polyol;
   (b) bisphenolic stabilizer of formula (I):

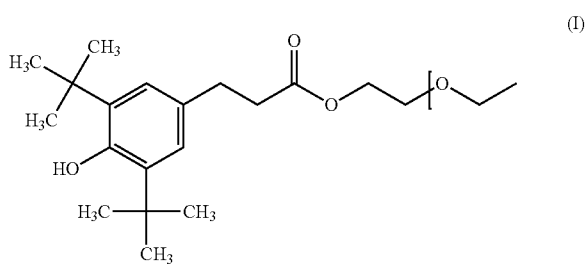

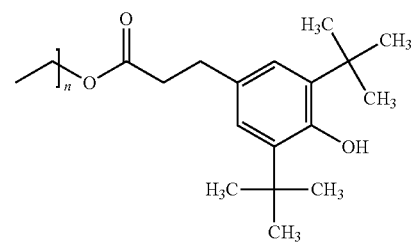

n is 2, 3 or 4; and (c) a chromanol stabilizer of formula (II):

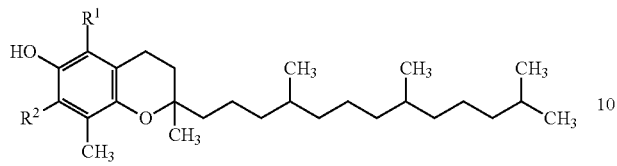

wherein;

$R^1$ and $R^2$ are independently of each other H or $C_1$-alkyl; and

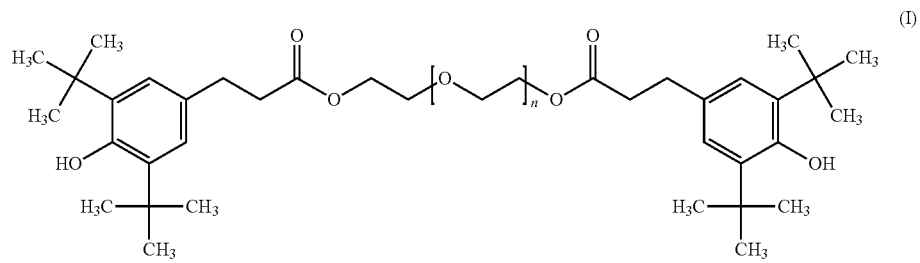

a weight ratio of the bisphenolic stabilizer (b) to the chromanol stabilizer (c) is between 0.9 and 11.

2. The composition according to claim 1, wherein in the formula (I), n is 3.

3. The composition according to claim 1, wherein in the formula (II), at least one of $R^1$ and $R^2$ is $C_1$-alkyl.

4. The composition according to claim 3, wherein in the formula (II), $R^1$ and $R^2$ are $C_1$-alkyl.

5. The composition according to claim 1, wherein the organic material of component (a) is the polyurethane formed from a polyether polyol.

6. The composition according to claim 1, wherein a combined amount of the bisphenolic stabilizer (b) and the chromanol stabilizer (c) is in the range from 0.1% to 10% by weight based on the weight of the organic material (a).

7. The composition according to claim 1, wherein a weight ratio of the bisphenolic stabilizer (b) to the chromanol stabilizer (c) is between 0.95 and 8.

8. The composition according to claim 1, further comprising:

(d) an additive.

9. The composition according to claim 8, wherein additive (d) is a phosphite, a benzofuran-2-one or an aromatic amine.

10. The composition according to claim 8, wherein a combined amount of the bisphenolic stabilizer (b), the chromanol stabilizer (c) and the additive (d) is in the range from 0.1% to 10% by weight based on the weight of the organic material (a).

11. The composition according to claim 8, wherein a weight ratio of the bisphenolic stabilizer (b) to the additive (d) is between 0.9 and 11.

12. The composition according to claim 1, wherein the bisphenolic stabilizer (b) is a mixture of at least two bisphenolic stabilizers of the formula (I), wherein the first bisphenolic stabilizer is of formula (I) with n, and the second bisphenolic stabilizer is of formula (I) with n+1.

13. A process for manufacturing the composition according to claim 1, the process comprising:

(i) incorporating the bisphenolic stabilizer (b) and the chromanol stabilizer (c) or an additive mixture, which comprises the bisphenolic stabilizer (b) and the chromanol stabilizer (c), into the organic material (a).

14. An additive mixture, comprising:

(b) a bisphenolic stabilizer of formula (I):

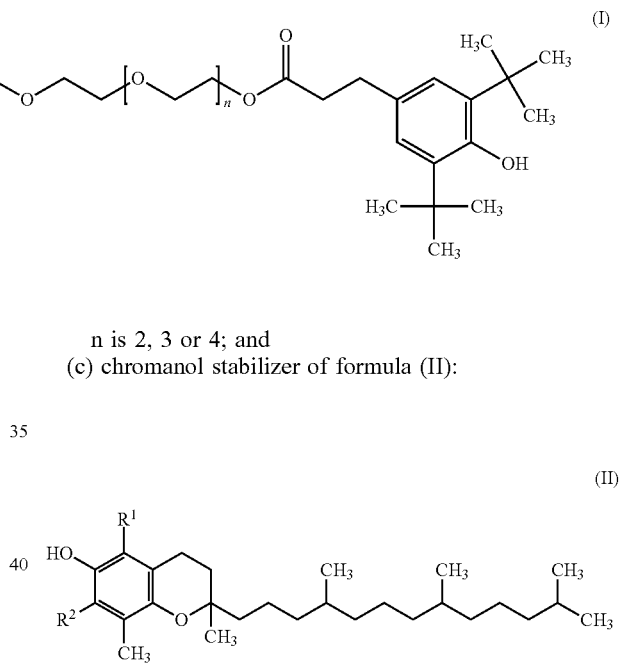

n is 2, 3 or 4; and (c) chromanol stabilizer of formula (II):

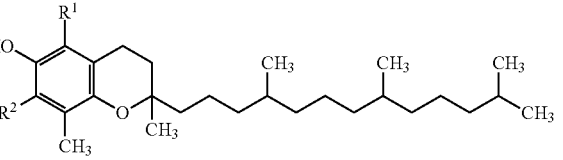

wherein;

$R^1$ and $R^2$ are independently of each other H or $C_1$-alkyl; and a weight ratio of the bisphenolic stabilizer (b) to the chromanol stabilizer (c) is between 0.9 and 11.

15. The additive mixture according to claim 14, further comprising:

(d) an additive.

16. A method for protecting an organic material against degradation, the method comprising:

incorporating the additive mixture according to claim 14 into the organic material, wherein the organic material is a polyether polyol or a polyurethane formed from a polyether polyol, said organic material being susceptible to oxidative, thermal or light-induced degradation.

17. The method according to claim 16, wherein the organic material is the polyurethane formed from a polyether polyol, which is protected against yellowing.

* * * * *

UNITED STATES PATENT AND TRADEMARK OFFICE
CERTIFICATE OF CORRECTION

PATENT NO.         : 10,683,409 B2
APPLICATION NO.    : 16/070596
DATED              : June 16, 2020
INVENTOR(S)        : Alex Wegmann et al.

It is certified that error appears in the above-identified patent and that said Letters Patent is hereby corrected as shown below:

In the Specification

Columns 1-2, Lines 21-30, the structure should read

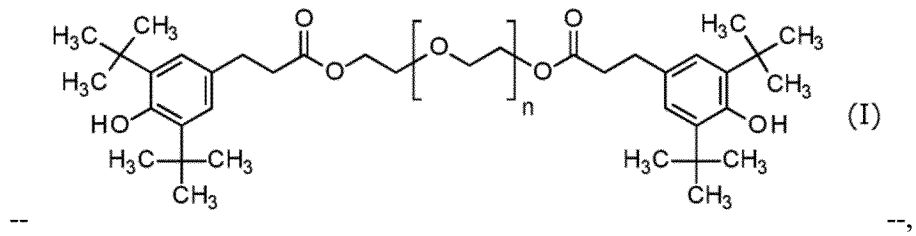
--                                                                              --, Column 3, Line 17, "trimethylol propane" should read -- trimethylolpropane --, Column 4, Lines 31-40, the structure should read -- 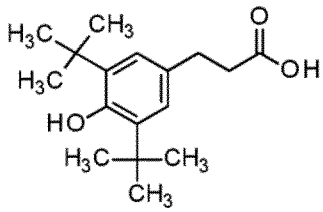 --, Column 6, Line 28, "methyl phenol," should read -- methylphenol, --, Column 6, Line 33, "(1-methylundec-1-yl)" should read -- (1'-methylundec-1'-yl) --, Column 6, Line 34, "1-yl)" should read -- 1'-yl) --, Column 7, Line 54, "d i-tert" should read -- di-tert --, Column 8, Line 66, "1,3'" should read -- 1',3' --, Signed and Sealed this
    Eighth Day of June, 2021

Drew Hirshfeld
*Performing the Functions and Duties of the
Under Secretary of Commerce for Intellectual Property and
Director of the United States Patent and Trademark Office*

Column 9, Line 16, "Stabilisers" should read -- Stabilizers --,

Column 10, Line 3, "6" should read -- β --,

Column 11, Line 10, "}4-[1," should read -- }-[1, --,

Column 12, Lines 3-4, "oxalyldihydrazide," should read -- oxalyl dihydrazide, --, Column 14, Line 33, "dimistryl" should read -- dimyristyl --, Column 15, Line 67, "(Declorane" should read -- (Dechlorane --, Column 16, Line 11, "halogentated" should read -- halogenated --, Columns 19-20, Lines 24-35, the structure should read

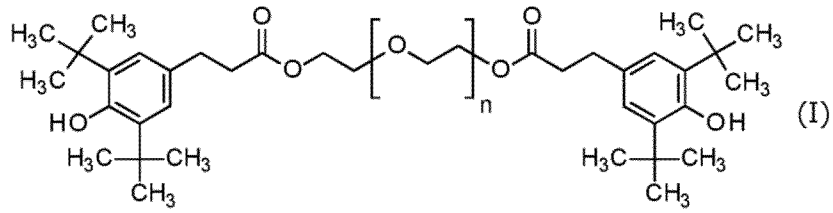

-- --,

Column 19, Line 65, "tetrapack," should read -- tetra pack, --,

Columns 21-22, Lines 27-37, the structure should read

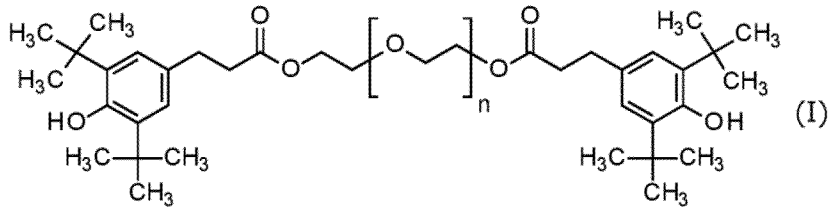

-- --,

Column 25, Line 14, "cylcohexane" should read -- cyclohexane --,

Column 29, Line 25, "toluylene" should read -- toluene --,

Column 29, Line 26, "toluylene" should read -- toluene --,

Column 32, Line 30, "re-suit" should read -- result --,

In the Claims

Column 32, Line 37, Claim 1, "comprising" should read -- comprising: --,

CERTIFICATE OF CORRECTION (continued)
U.S. Pat. No. 10,683,409 B2

Column 32, Line 41, Claim 1, "front a" should read -- from a --,

Column 32, Line 42, Claim 1, "(b)bisphenolic" should read -- (b) a bisphenolic --, Column 34, Line 33, Claim 14, "(c) chromanol" should read -- (c) a chromanol --.